United States Patent
Chung et al.

(10) Patent No.: US 9,073,208 B2
(45) Date of Patent: Jul. 7, 2015

(54) GRIPPER APPARATUS AND METHOD FOR CONTROLLING THE SAME

(71) Applicant: Industrial Technology Research Institute, Hsin-Chu (TW)

(72) Inventors: Wei-Der Chung, Taipei (TW); Yan-Chen Liu, Taipei (TW); Chwan-Hsen Chen, Taoyuan County (TW); Cheng-Yen Li, Yilan County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 213 days.

(21) Appl. No.: 13/894,559

(22) Filed: May 15, 2013

(65) Prior Publication Data

US 2014/0180477 A1      Jun. 26, 2014

(30) Foreign Application Priority Data

Dec. 25, 2012   (TW) .............................. 101149793 A

(51) Int. Cl.
*B25J 9/16*         (2006.01)
*B25J 13/08*        (2006.01)
*B25J 15/02*        (2006.01)

(52) U.S. Cl.
CPC .............. *B25J 9/1612* (2013.01); *B25J 13/082* (2013.01); *B25J 15/0213* (2013.01)

(58) Field of Classification Search
CPC .................. B25J 3/00; B25J 3/04; B25J 9/00; B25J 9/0009; B25J 9/0012; B25J 9/0021; B25J 9/0045; B25J 9/0048; B25J 9/0084; B25J 9/0087; B25J 9/009; B25J 9/06; B25J 9/1612; B25J 9/1623; B25J 13/02; B25J 13/08; B25J 13/085; B25J 17/00; B25J 19/02
See application file for complete search history.

(56) References Cited

U.S. PATENT DOCUMENTS 4,810,019 A     3/1989   Brucher
5,523,662 A *   6/1996   Goldenberg et al. .... 318/568.11
(Continued)

FOREIGN PATENT DOCUMENTS

CN     1365877         8/2002
CN     1557268 A      12/2004
(Continued)

OTHER PUBLICATIONS

Taiwan Patent Office, "Office Action", Sep. 22, 2014.
(Continued)

*Primary Examiner* — Nicholas Kiswanto
(74) *Attorney, Agent, or Firm* — WPAT, PC; Justin King

(57) ABSTRACT

A gripper apparatus and its control method are provided. The gripper apparatus includes at least one gripper unit, and each gripper unit is configured with a first connecting rod and a second connecting rod. In addition, there is an elastic part disposed at the joint of the first and the second connecting rods, an encoder and a controller. Thereby, the controller is enabled to control the gripper apparatus to move toward an object in a first mode so as to enable the gripper unit to engage the object and thus exert a force upon the object. Consequently, the elastic part is deformed and the deformation of the elastic part is measured and encoded by the encoder into a force information to be transmitted to the controller for enabling the controller to switch the control of the gripper apparatus into a second mode according to the force information.

10 Claims, 8 Drawing Sheets

(56) References Cited

U.S. PATENT DOCUMENTS

| | | | |
|---|---|---|---|
| 5,762,390 | A | 6/1998 | Gosselin et al. |
| 7,168,748 | B2 | 1/2007 | Townsend et al. |
| 2006/0145495 | A1 | 7/2006 | Fang et al. |
| 2009/0025502 | A1* | 1/2009 | Nakamoto ............... 74/490.01 |
| 2010/0181792 | A1 | 7/2010 | Birglen |
| 2011/0156416 | A1 | 6/2011 | Kawanami et al. |
| 2011/0308347 | A1 | 12/2011 | Chen et al. |
| 2013/0346348 | A1* | 12/2013 | Buehler et al. ............... 706/12 |

FOREIGN PATENT DOCUMENTS

| | | |
|---|---|---|
| CN | 1843713 | 10/2006 |
| CN | 101284380 | 10/2008 |
| CN | 101602208 | 12/2009 |
| CN | 101693372 A | 4/2010 |
| CN | 102107432 | 6/2011 |
| JP | 2009025989 | 2/2009 |
| TW | 201020079 | 6/2010 |
| TW | 201219174 | 5/2012 |
| TW | 201238723 A1 | 10/2012 |

OTHER PUBLICATIONS

Wang, "Design of a Humanoid Robotic Hand with Linkage Mechanism and Linear Actuators", 2009, airiti Library.

Kai-Yuan Cheng, "Design and Control of a Multi-fingered Robot Hand", 2008, National Digital Library of Theses and Dissertations in Taiwan.

Liu, et al., "The Modular Multisensory DLR-HIT-Hand: Hardware and Software Architecture", Aug. 2008, pp. 461-469, vol. 13, No. 4, IEEE/ASME Transactions on Mechatronics.

Liu, et al., "The modular multisensory DLR-HIT-Hand", 2007, pp. 612-625, Mechanism and Machine Theory.

Pounds, et al., "Grasping From the Air: Hovering Capture and Load Stability", May 9-13, 2011, pp. 2491-2498, IEEE International Conference on Robotics and Automation Shanghai International Conference Center.

Ellwood, et al., "Vision and Force Sensing to Decrease Assembly Uncertainty", 2010, pp. 123-130, IFIP International Federation for Information Processing.

Dollar, et al., "Contact sensing and grasping performance of compliant hands", 2009, pp. 65-75, Springer Science +Business Media, LLC.

Silva, et al., "Integrated structure and control design for mechatronic systems with configuration-dependent dynamics", 2009, Mechatronics 19.

Reinhart, et al., "Robot based system for the automation of flow assembly lines", 2009, pp. 121-126, Springer.

Dollar, et al., "Towards grasping in unstructured environments: grasper compliance and configuration optimization", 2005, pp. 523-543, vol. 19, No. 5,Advanced Robotics.

Boubekri, et al., "Robotic grasping: gripper designs, control methods and grasp configurations—a review of research", 2002, pp. 520-531, Emerald.

Boubekri, et al., "Design of Grasping Methodologies for Rotational Assembly Components", 1992, pp. 157-164, IEEE.

China Patent Office, "Office Action," Apr. 29, 2014.

* cited by examiner

GRIPPER APPARATUS AND METHOD FOR CONTROLLING THE SAME

CROSS REFERENCE TO RELATED APPLICATION

This application also claims priority to Taiwan Patent Application No. 101149793 filed in the Taiwan Patent Office on Dec. 25, 2012, the entire content of which is incorporated herein by reference.

TECHNICAL FIELD

The present disclosure relates to a gripper apparatus and its control method.

BACKGROUND

Most industrial robots available and used today are programmed to faithfully carry out specific actions over and over again with a high degree of accuracy according to programmed routines that specify the direction, acceleration, velocity, deceleration, and distance of a series of coordinated motions. However, it is becoming an increasingly important factor in the modern industrial robot to be equipped with good hand-eye coordination for enabling the robots to be much more flexible as to the orientation of the object on which they are operating. Thus, modern robots may even have machine vision sub-systems to visually identify objects for more precise guidance and also link to powerful computers for smart controlling so as to work in compliance in a hybrid man/machine environment. Consequently, there are more and more resources being put into the development of robotic hand-eye coordination technology that can be adapted for electronics industry, food industry and traditional manufacturing industry, and among which the intelligent automation in the electronic industry is most regarded by the consumer electronic manufacturers in Asia. With the increasing labor cost in China, the need for more advanced automation process is increasing worldwidely. Nevertheless, there is still no adequate robotic hand-eye coordination technique available now to be used in the development of a robotic controller with sufficient hand-eye coordination ability.

Generally, a good robotic gripper should be small, light-weighted, highly agile and formed with realistic outlook. With the development and application of industrial robots, there is a great improvement on the robotic gripper design recently. Nevertheless, in most current robotic grippers, they are designed to have force sensors to be disposed at different positions on their grippers in respective. For instance, in a palm-like gripper, it is generally to have one or more than one force sensors or tactile sensor to be arranged at knuckles or finger tips, and thereby, if it is intended to pick up an object, it is ensured to have at least one such force sensor to be disposed at corresponding position so as to be engaged by the object, so that the engaged force sensor is activated to feedback signals of force or pressure relating to the engagement for assisting the gripper to grasp and hold on to the object. In addition to the force sensor or tactile sensor, another control approach of load current detection can be adopted by disposing current probes on a robotic gripper, by that an evaluation of whether the robotic gripper is engaged with an object is made according to whether or not a load current form the current probes is larger than a specific threshold value.

SUMMARY

The present disclosure provides a gripper apparatus and its control method, that are capable of detecting a deformation by the cooperation of an elastic part and an encoder of the gripper apparatus and also capable of enabling the structural shape of the gripper apparatus to change in compliance to an external force In an exemplary embodiment, the present disclosure provides a gripper apparatus, comprising: at least one gripper unit, and each gripper unit is configured with a first connecting rod, a second connecting rod, an elastic part, a driver, an encoder and a controller. The first connecting rod has a first end and a second end that are arranged opposite to each other; and the second connecting rod has a third end and a fourth end that are arranged opposite to each other while enabling the third end to couple to the second end of the first connecting rod. In addition, the elastic part is disposed at the joint of the first and the second connecting rods to be used for enabling the first connecting rod to couple elastically to the second connecting rod, while also allowing the elastic part to connect electrically to the encoder that is further to be electrically connected to the controller, and the driver is connected to the fourth end so as to be used for driving the second connecting rod and the first connecting rod to swing in synchronization. Thereby, the deformation of the elastic part measured and encoded by the encoder into a force information to be transmitted to the controller for enabling the controller to switch the operation mode of the gripper apparatus according to the force information.

In another exemplary embodiment, the present disclosure further provides a method for controlling a gripper apparatus, which comprise the steps of: using a controller to control a gripper apparatus, whereas the gripper apparatus comprises at least one gripper unit, and each gripper unit is configured with a first connecting rod and a second connecting rod that are interconnected to each other; the first connecting rod has a first end and a second end that are arranged opposite to each other; and the second connecting rod has a third end and a fourth end that are arranged opposite to each other while enabling the third end to couple to the second end of the first connecting rod and the fourth end to couple to a driver; and in addition, there is an elastic part disposed at the joint of the first and the second connecting rods, while the elastic part is connected electrically to an encoder that is further to be electrically connected to the controller; enabling the controller to control the gripper apparatus to move toward an object in a first operation mode so as to enable the gripper unit to engage the object and thus exert a force upon the object; and consequently, enabling the elastic part to be deformed while allowing the deformation of the elastic part to be measured and encoded by the encoder into a force information and then to be transmitted to the controller for enabling the controller to switch the control of the gripper apparatus into a second operation mode according to the force information.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 2:
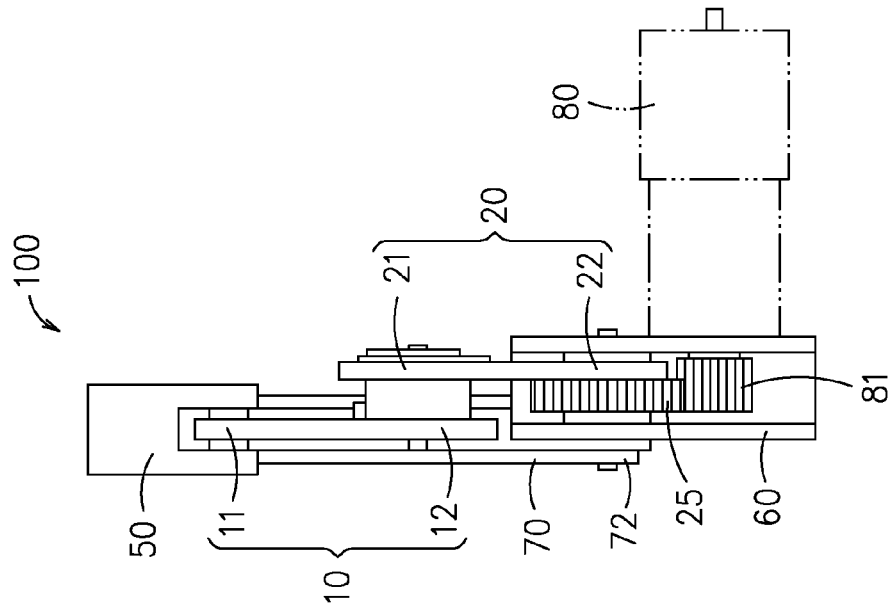
FIG. 2 is an A-A cross sectional view of FIG. 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
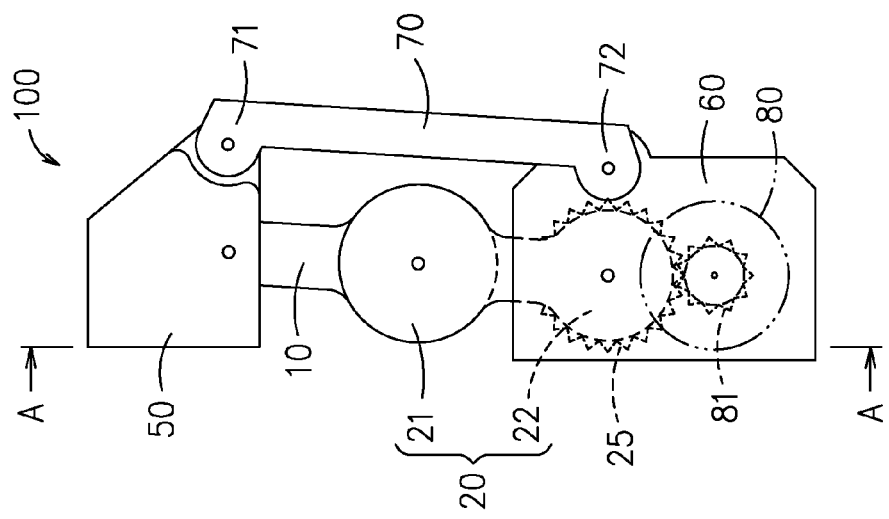
FIG. 1 is a front view of a gripper apparatus according to an embodiment of the present disclosure.
Figure 3:
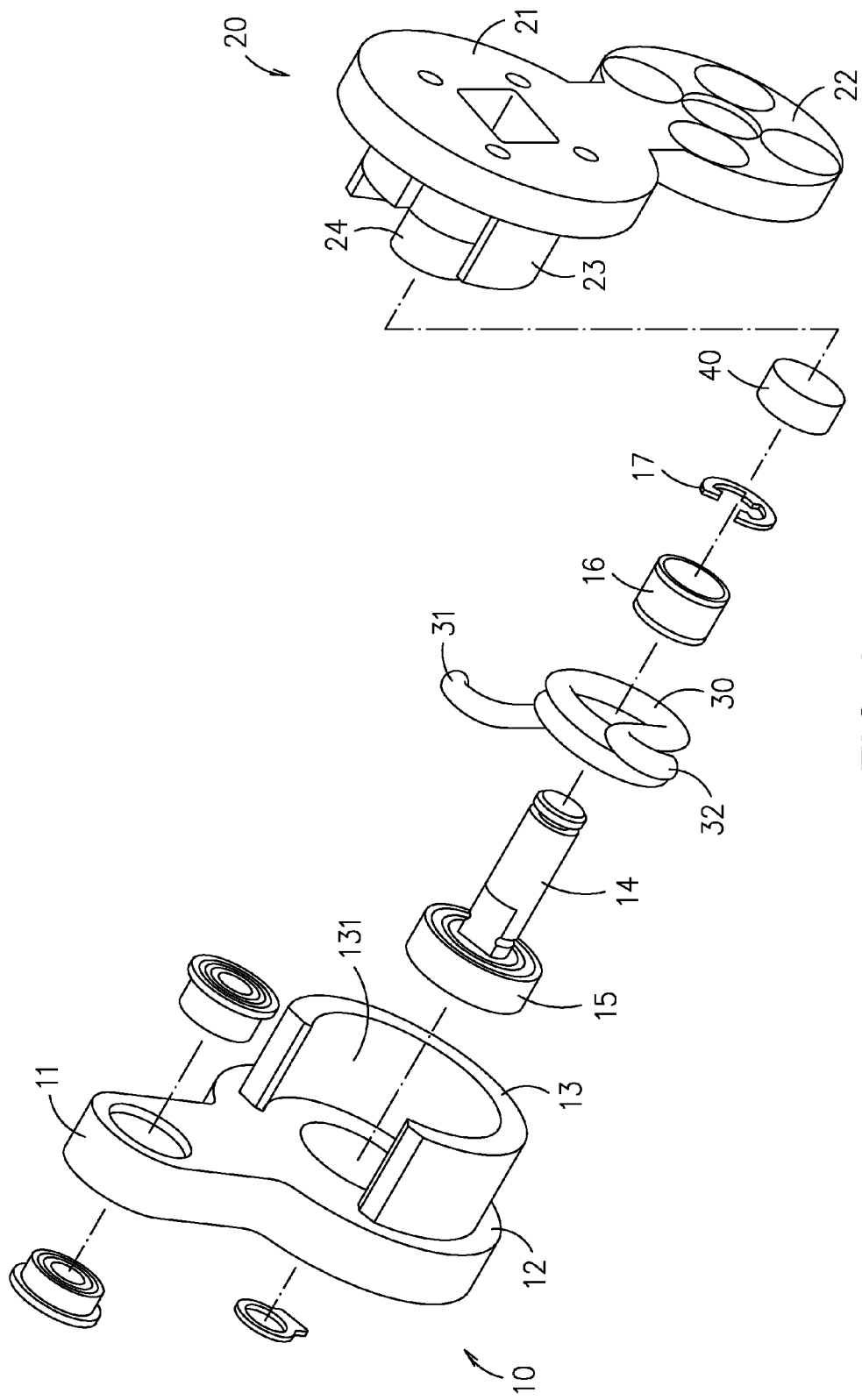
FIG. 3 is an exploded diagram showing a first connecting rod and a second connecting rod in a gripper apparatus of the present disclosure.

As an exemplary embodiment shown in FIG. 1 to FIG. 3, the gripper apparatus comprises: a gripper unit 100, whereas the gripper unit 100 is further configured with a first connecting rod 10 and a second connecting rod 20. Moreover, the first connecting rod has a first end 11 and a second end 12 that are arranged opposite to each other; and the second connecting rod 20 has a third end 21 and a fourth end 22 that are arranged opposite to each other, while the second end 12 of the first connecting rod 10 is coupled to the third end 21 of the second connecting rod 20. In addition, there is an elastic part 30 disposed at the joint of the first connecting rod 10 and the second connecting rod 20. In FIG. 3, there is further a first sleeve 13 mounted on the second end 12 of the first connecting rod 10, that is used for receiving a first shaft 14 therein, whereas the first shaft 14 has a bearing 15 disposed at an end thereof. It is noted that the elastic part 30 is also being received inside the first sleeve 13 while allowing the two elastic ends 31, 32 of the elastic part 30 to abut upon the inner wall of the first sleeve 13. The elastic part 30 further has a bush 16 disposed at a position therein for allowing an end of the first shaft 14 that is arranged opposite to the end of the bearing 15 to pierce therethrough. In addition, there is a snap ring 17 attached to end of the first shaft 14 that is arranged opposite to the end of the bearing 15. Similarly, there is a second sleeve 23 mounted on the third end 21 of the third end 21 of the second connecting rod 20, that is used for receiving a second shaft 24 while allowing the second shaft 24 and the second sleeve 23 to be orientated facing toward the first connecting rod 10, whereas the second sleeve 23 is ensheathed inside the first sleeve 13 and the second shaft 24 is arranged coaxial to the first shaft 14. Thereby, an encoder 40 can be mounted on the first shaft 14 and the second shaft 24 while allowing the elastic part 30 to connected electrically to the encoder 40, so that the encoder 40 can be used to detect and measure a deformation of the elastic part 30 so as to generate a force information accordingly. Consequently, the elastic part 30 and the encoder 40 are sandwiched between the first connecting rod 10 and the second connecting rod 20, and thus the first connecting rod can be elastically coupled to the second connecting rod 20 by the elastic part 30.

Moreover, there is a first gripper 50 disposed at the first end 11 of the first connecting rod 10, and also there is a base 60 provided for the fourth end 22 of the second connecting rod 20 to pivotally couple thereat. Consequently, there can be a third connecting rod 70 arranged at a position between the first gripper 50 and the base 60, which is configured with a fifth end 70 and the sixth end 72 that are disposed opposite to each other while allowing the fifth end 70 to couple to the first gripper 50 and the sixth end 72 to coupled to the base 60. In addition, there is a passive gear 25 arranged at the fourth end 22 that is engaged and meshed to an active gear 81 whereas the active gear 81 is further connected to a driver 80. Thereby, the fourth end 22 of the second connecting rod 20 is connected to the driver 80 through the cooperation of the passive gear 25 and the active gear 80. It is noted that the driver 80 can be a DC servo motor. The driver 80 and the encoder 40 are simultaneously and electrically connected to a controller, so that the controller is able to switch the operation of the gripper apparatus according to the force information of the encoder 40. In this embodiment, the controller is a 16-bit micro control unit having a current feedback circuit and a driving circuit of the driver 80 integrated therein and is electrically connected to the serial and feedback circuits of the encoder 40 so as to achieve an embedded control system.

Figure 5:
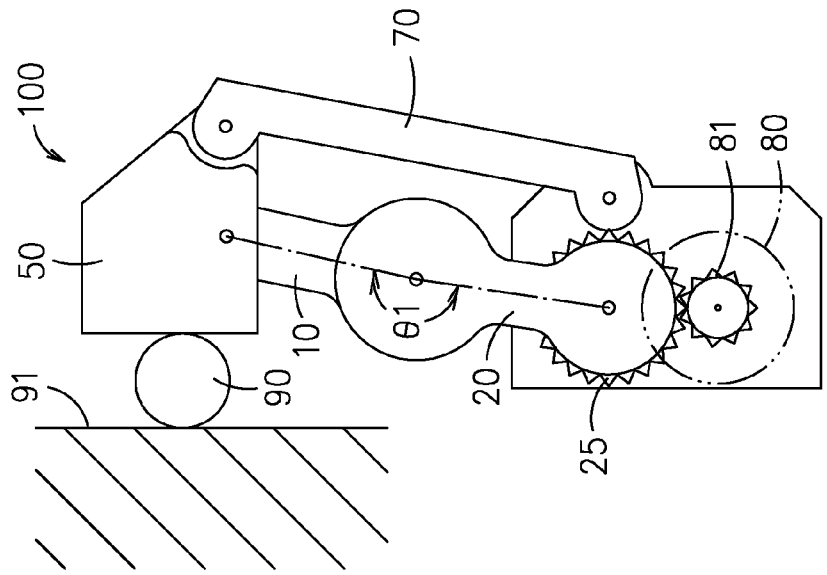
FIG. 4 and FIG. 5 are schematic diagrams showing movements of the gripper apparatus of FIG. 1 for grasping an object.
Figure 4:
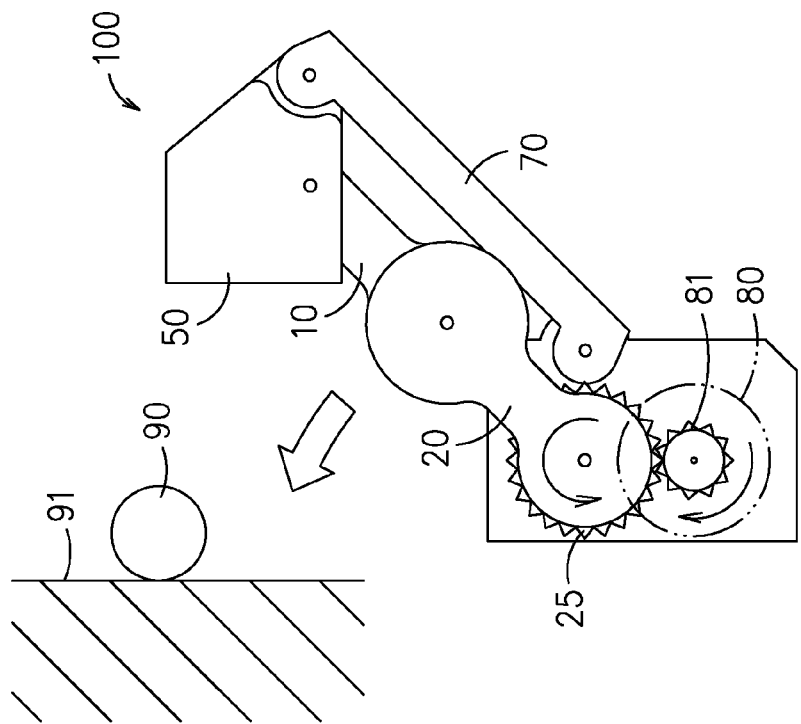
Figure 6:
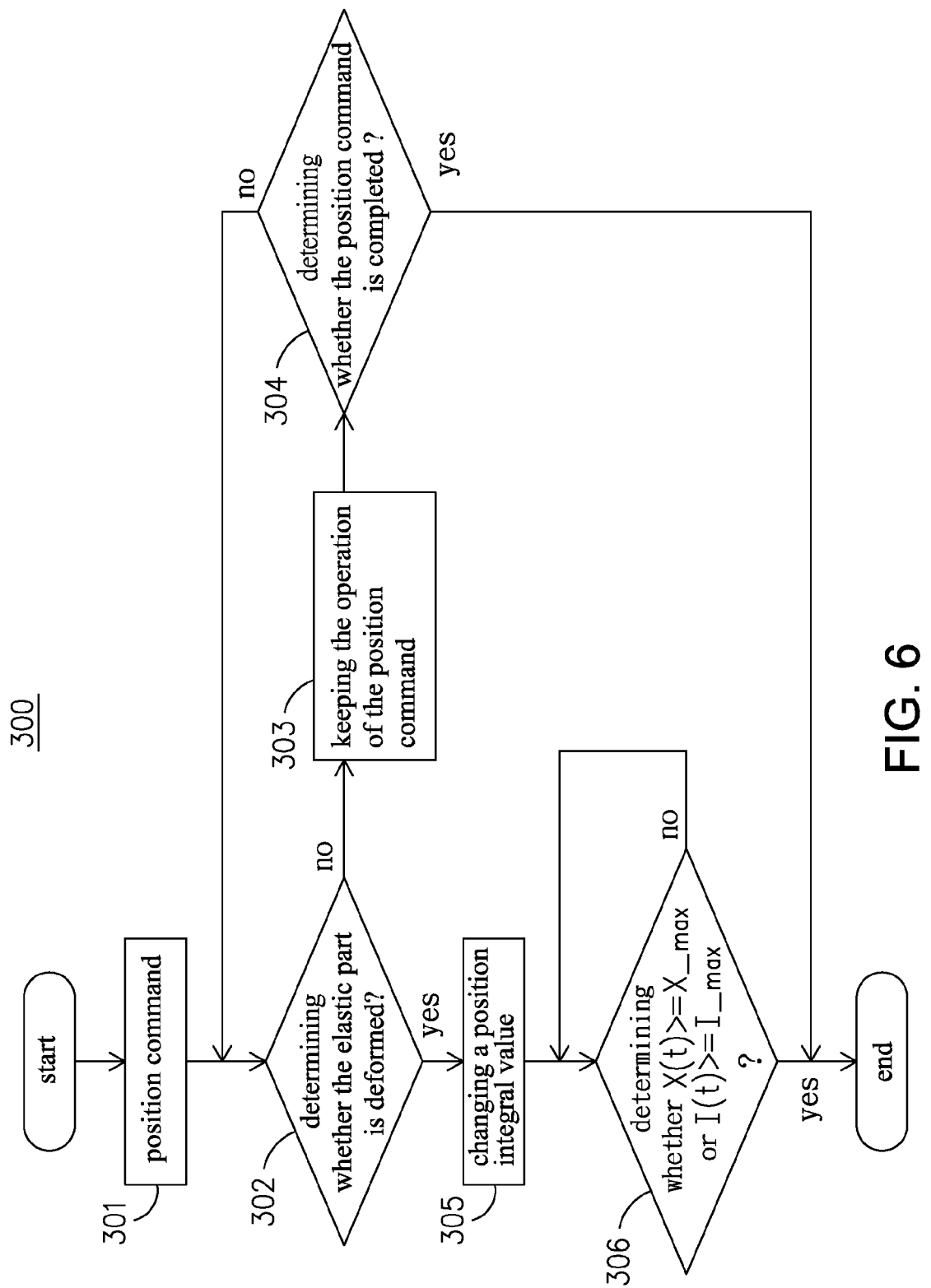
FIG. 6 is a flow chart depicting steps performed in a compliance control method of the present disclosure.
Figure 7:
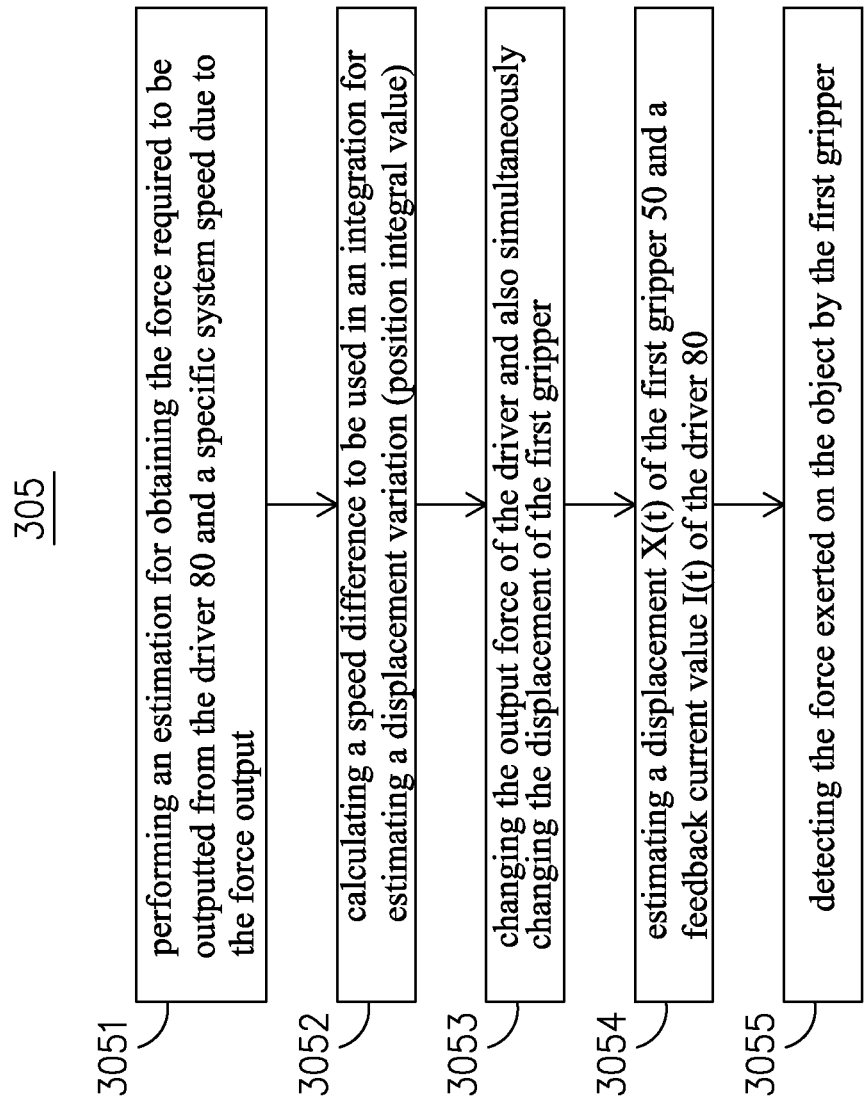
FIG. 7 is a flow chart depicting steps for changing a position integral value in the present disclosure.

FIG. 4 and FIG. 5 are schematic diagrams showing movements of the gripper apparatus of FIG. 1 for grasping an object. FIG. 6 is a flow chart depicting steps performed in a compliance control method of the present disclosure. FIG. 7 is a flow chart depicting steps for changing a position integral value in the present disclosure. As shown in FIG. 4 to FIG. 7, a controller is enabled to execute a compliance control process 300, and the process starts at the step 301. At step 301, the controller is enabled to generate a position command for controlling a gripper unit 100 of the gripper apparatus to operate under a first operation mode, which is a positioning mode, in view of the moving direction and moving distance of the gripper unit 100 relative to an object 90 to be grasped, and also the grasping force of the gripper unit 100 that is to be exerted on the object 90; and then the flow proceeds to step 302. As shown in FIG. 4, the gripper unit 100 that is controlled to operate under the first operation mode is enabled to move toward the object 90 whereas the object 90 is placed on a planar surface 90, and as soon as the gripper unit 100 is properly positioned for grasping the object 90, the active gear 80 is activated for bringing along the passive gear 25 to rotate for driving the second connecting rod 20, the first connecting rod 10, the first gripper 50 and the third connecting rod 70 to swing toward the object 90, while simultaneously maintaining the execution of the position command before the object 90 is engaged by the first gripper 50.

At step 302, at the time when the first gripper 50 engages the object 90, an evaluation is made for determining whether the elastic part is deformed, as shown in FIG. 3; if so, the flow proceeds to step 303 for maintaining the execution of the position command; otherwise, the flow proceeds to step 305 for changing a position integral value. Specifically, if it is the time when the first gripper just touch the object 90 or in a condition when the grasping force exerted upon the object 90 by the first gripper 50 is not larger than a predefined force that is assumed to be sufficient for grasping the object 90, the elastic part will not be deformed so that the execution of the position command will be maintained, as indicated at the step 303, and then the flow proceeds to step 304 for determining whether the position command is completed, and if so, the driver 80 is stopped for ending the process, otherwise, the flow proceeds back to step 302.

As shown in FIG. 5, the object 90 is engaged by the first gripper 50 and the grasping force exerted on the object 90 by the first gripper 50 is larger enough for enabling the elastic part o deform, and thereby, the included angle $\theta_1$ between the first connecting rod 10 and the second connecting rod 20 will change according to the deformation of the elastic part which is further being affected by the variation of the grasping force, the shape, size and material of the object 90. The changing of the included angle $\theta_1$ is detected and encoded by the encoder into a detection information to be transmitted to the controller. As soon the detection information is received by the controller, the controller will control the gripper apparatus to enter a second operation mode, which is a compliance control mode. As the elastic part is deformed for enabling the second operation mode and also the flow is proceeded to the step 305, it is noted that the step 305 for changing a position integral value further comprises the following steps:

step 3051: the controller is enable to perform an estimation according to the relationship between system speed and force for obtaining the force required to be outputted from the driver 80 for maintaining the system at a specific speed;

step 3052: a speed difference is calculated and used in an integration for estimating a displacement variation (position integral value);

step 3053: the controller is enabled to issue a control command for changing the output force of the driver 80 and also simultaneously changing the displacement of the first gripper 50;

step 3054: the controller is enabled to use a force meter to estimate the displacement X(t) of the first gripper 50 and the feedback current value I(t) of the driver 80;

step 3055: a net force which is a resultant of the force exerted on the object 90 by the first gripper 50 and the force acting on the system also by the first gripper is detected based upon the relationship between system parameter and system force, and then the force detection is used in an evaluation for determining whether the force is equal to a predefined maximum.

If the displacement X(t) of the first gripper 50 is still smaller than a predefined displacement maximum X_max, or the feedback current value I(t) is still smaller than a predefined feedback current maximum I_max, the driver is enabled to operate continuously for enabling the first gripper 50 to keep exerting force upon the object 90. On the other hand, when the displacement X(t) of the first gripper 50 reaches the predefined displacement maximum X_max, i.e. X(t)>=X_max, or the feedback current value I(t) reaches the predefined feedback current maximum I_max, i.e. I(t)>= I_max, the operation of the driver 80 is stopped.

In this embodiment, the displacement maximum X_max and the feedback current maximum I_max are determined according to the maximum sustainable deformation of the object, and it is noted that the maximum sustainable deformation of the object can be varied according to the material and shape of the object. That is, an object made of glass is able to sustain a force different than that exerted upon a metallic object, whereas the shape of the object will also cause difference.

The compliance control mode is designed to control a displacement to vary according to the direction and magnitude of an external force, to use an encoder to detect and measure the deformation of an elastic part in a gripper that is used for grasping an object, and also to control a force for grasping according to a position displacement and a feedback current. Thereby, not only the requiring of eccentric parts and positioning errors that are common in conventional robots are solved, but also it is superior in cost, reaction speed and reliability than those conventional robots using force meters or current valves for contact detection.

The following is the description relating to the operation principle of the compliance control mode that is disclosed in the present disclosure. Assuming that a system is featured by an inertial J with a damping constant b, the behavior of the system can be represented by the following formula:

$$J\ddot{\theta}(t)+b\dot{\theta}(t)=T(t)=T_{ext}(t)$$

wherein $\theta(t)$ represents a system displacement;

T(t) represents a net force $T_{ext}(t)$ exerted on the system

In addition, a value of impedance is defined to be a speed variation of the system due to an external force, and represents as following:

$$\frac{\text{Force}}{\text{Speed}} = \text{Impedance}$$

Accordingly, the system impedance can be defined as following:

$$\frac{T_{est}(s)}{\dot{\theta}(s)} = Js + b;$$

Therefore, if the system speed is adjusted to $\dot{\theta}_r$ at a condition when a target system impedance is smaller than an original system impedance, the speed difference, i.e. $\Delta\dot{\theta}(s)=\dot{\theta}_r(s)-\dot{\theta}(s)$, must be compensated by an actuator in a manner that a motor in the system is required to output a torque $T_m$ for compensation so as to achieved the predefined target speed $\dot{\theta}_r$, according to that the original formula of system behavior is changed to the following formula:

$$J_r\ddot{\theta}_r(t)+b\dot{\theta}_r(t)=T(t)=T_{ext}(t)+T_m(t);$$

Thereby, the position integral value can be changed by the output of the actuator, and the compliance control target can be achieved without the need of any addition parts in the system.

Since there is no additional force meters in the system, the controller is required to acquire parameters of the driver to be used for estimating the force of the system. Assuming the driver is a DC servo motor, the differential equation relating to the input voltage $V_i(t)$ and angle $\theta_m(t)$ is as following:

$$\frac{R_a}{K_t}T_m(t) + K_b\dot{\theta}_m = V_i(t)$$

wherein, $R_a$, $K_t$, $K_b$, and $T_m$ are respectively the armature resistance, torque coefficient, coefficient of mutual induction and motor shaft torque.

When the motor is rotating at a low speed, i.e. $\dot{\theta}_m \rightarrow 0$, the torque and voltage are proportional in a manner: $T(t) \propto V_i(t)$. On the other hand, a precision resistance can be added to the PWM driving circuit of the motor to be used for detecting a feedback current value I(t), and based upon the relation of: $T_m(t)=K_t*I(t)$, the voltage drop of the precision resistance is proportional to the torque $T_m(t)$.

Assuming the motor is used for driving the first gripper directly while the rigidity of the first gripper, i.e. K_gripper, is infinitely large, the relationship between the angle $\theta_m(t)$ and current $I(t)$ of the motor can be used for representing the relationship between the displacement $X(t)$ and the grasping force $F(t)$ of the first gripper as following:

$$F(t)=K\_object*X(t)$$

wherein, K_object represents the rigidity of an object. Theoretically, K_object=0 before the object is engaged by the first gripper, but K_object→∝ when the object being engaged by the first gripper is a rigid body. However, due to the limitation of the first gripper's rigidity, the rigidity of the object that is detectable must fall within a range of 0<K_object≤K_gripper. Based upon the foregoing observation, grasping force of the first gripper can be estimated through the measuring of angular displacement and feedback current upon the connecting rod or motor so as to determine the exact time when the first gripper is in contact with the object, and thereby, through the control of the displacement and current, the grasping force of the first gripper exerting upon the object can be controlled and the rigidity of the object can be evaluated. Operationally, a positioning operation mode with low rigidity will be used and maintained before the first gripper engages with the object, but after engaging, a compliance control mode with maximum output limit will be enabled to be used in the following process.

Figure 8:
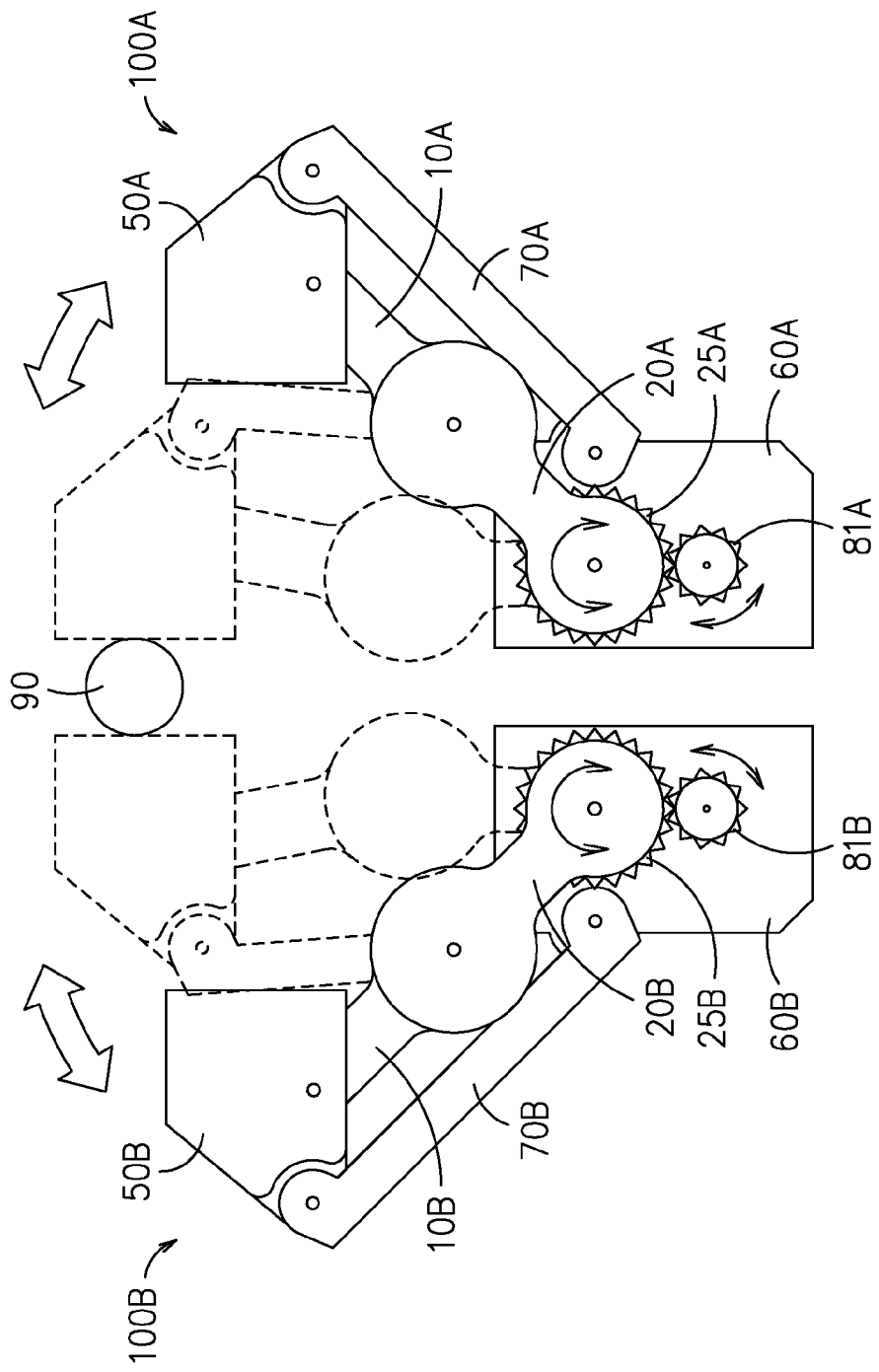
FIG. 8 to FIG. 10 are schematic diagrams showing various gripper apparatus according to different embodiments of the present disclosure.

In an exemplary embodiment shown in FIG. 8, the gripper apparatus has two gripper units 100A and 100B that are arranged opposite to each other in a symmetrical manner. The gripper unit 100A comprises: a first connecting rod 10A, a second connecting rod 20A, a first gripper 50A, a base 60A and a third connecting rod 70A, whereas similarly the gripper 100B comprises: a first connecting rod 10B, a second connecting rod 20B, a first gripper 50B, a base 60B and a third connecting rod 70B. In addition, there are two active gears 81A, 81B being disposed to mesh with their corresponding passive gears 25A, 25B in respective for bringing along the two passive gears 25A, 25B to rotate with the rotation of the two active gears 81A, 81B. Thereby, the two first grippers 50A and 50B can be brought along to move in a relative manner so as to clamp and hold the object between the two first grippers 50A, 50B.

Figure 9:
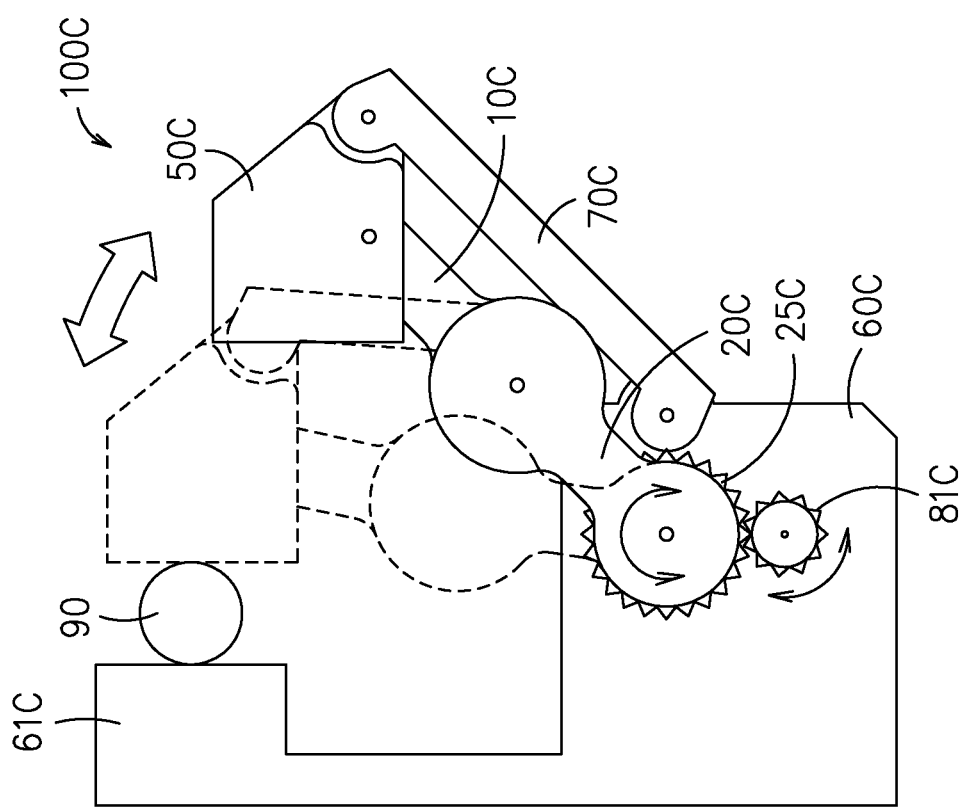

In an exemplary shown in FIG. 9, the gripper apparatus comprise one gripper unit 100C, which is configured with a first connecting rod 10C, a second connecting rod 20, a first gripper 50, a base 60C and a third connecting rod 70C. Moreover, in this embodiment, there is a second gripper 61C mounted on the base 60C, by that when the passive gear 25C is being brought along to rotate by the active gear 81C, the second connecting rod 20C, the first connecting rod 10C, the first gripper 50C and the third connecting rod 70C will be driven to swing back and forth in a reciprocation and synchronization manner, and thus the first gripper 50C can be driven to move relative to the movement of the second gripper 61C so as to clamp and hold the object between the two first gripper 50C and the second gripper 61C. In other words, the second gripper 61C is enabled to move relative to the first gripper 50C by the swinging of the second connecting rod 20C.

Figure 10:
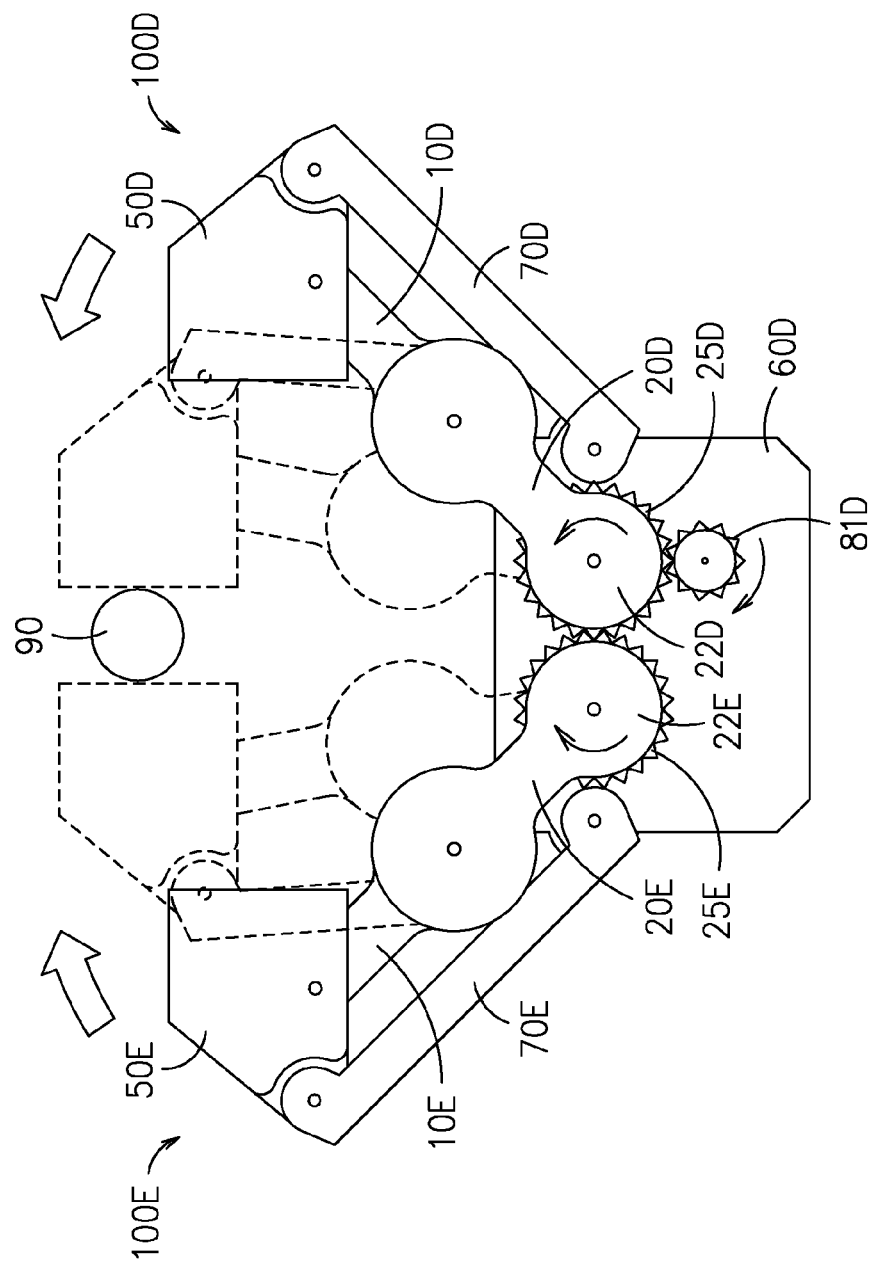

In an exemplary embodiment shown in FIG. 10, the gripper apparatus has two gripper units 100D and 100E that are arranged opposite to each other in a symmetrical manner. The gripper unit 100D comprises: a first connecting rod 10D, a second connecting rod 20D, a first gripper 50D, and a third connecting rod 70A, whereas similarly the gripper 100E comprises: a first connecting rod 10E, a second connecting rod 20E, a first gripper 50E, and a third connecting rod 70E. In addition, the two fourth ends 22D, 22E of the two second connecting rods 20D, 20E are both coupled to a same base 60D and simultaneously there are two passive gears 25D, 25E to be disposed respectively on the two fourth ends 22D, 22E of the two second connecting rods 20D, 20E that are engaged and meshed to each other, while allowing one of the two passive gears, that is the passive gear 25D in this embodiment, to engage and mesh to the active gear 81D. Thereby, the driver is enabled to drive the two second connecting rods 20D, 20E to swing in synchronization and the two first grippers 50D, 50E of the two first connecting rods 10D, 10E to move in a relative manner so as to clamp and hold the object between the two first grippers 50D, 50E.

It is noted that the shapes of the first connecting rod, the second connecting rod, the first gripper, the base and the third connecting rod are not limited by those disclosed in the aforesaid embodiments of the present disclosure, and thus they can be designed variously according to actual requirement, taking the size, shape and weight of the object to be grasped into consideration. For instance, the first gripper can be integrally formed with the first connecting rod, that is, the first end of the first connecting rod can be formed like a hook or into a shape with grasping ability. Moreover, the driver can be designed to drive the second connecting rod directly without having to transmit its driving power through the coupling of the active gear and passive gear; and also the active gear that is used for driving the passive gear can be replaced by a screw rod. In addition, the parallelogram four-bar linkage mechanism, that is composed of a first connecting rod, a second connecting rod, a first gripper, a base and a third connecting rod, is only used as an embodiment for the present disclosure.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A gripper apparatus, comprising: at least one gripper unit, and each gripper unit is configured with:
    a first connecting rod, having a first end and a second end that are arranged opposite to each other;
    a second connecting rod, having a third end and a fourth end that are arranged opposite to each other while enabling the third end to couple to the second end of the first connecting rod;
    an elastic part, disposed at a joint of the first and the second connecting rods to be used for enabling the first connecting rod to couple elastically to the second connecting rod;
    a driver, connected to the fourth end so as to be used for driving the second connecting rod and the first connecting rod to swing in synchronization;
    an encoder, connected electrically to the elastic part to be used for measuring and encoding a deformation of the elastic part into a force information; and
    a controller, electrically and respectively connected to the encoder and the driver, for switching a operation mode of the gripper apparatus according to the force information.

2. The gripper apparatus of claim 1, wherein the driver has an active gear to be disposed at a position allowing the active gear to engaged and meshed with a passive gear arranged at the fourth end.

3. The gripper apparatus of claim 2, further comprising two gripper units, arranged opposite to each other, wherein, there are two passive gears to be disposed respectively on the two fourth ends of the two second connecting rods of the two gripper units that are engaged and meshed to each other, while allowing one of the two passive gears to simultaneously engage and mesh to the active gear, and thereby, the driver is enabled to drive the two second connecting rods to swing in synchronization and the two first ends of the two first connecting rods to move in a relative manner.

4. The gripper apparatus of claim 1, further comprising:
   a first gripper, pivotally coupled to the first end;
   a base, provided for the fourth end to pivotally couple thereto; and
   a third connecting rod, formed with a fifth end and a sixth end that are arranged opposite to each other, while allowing the fifth end to pivotally coupled to the first gripper and the sixth end to pivotally couple to the base.

5. The gripper apparatus of claim 4, wherein the base has a second gripper to be mounted thereat in a manner the second gripper is enabled to move relative to the first gripper by the swinging of the second connecting rod.

6. The gripper apparatus of claim 4, further comprising two gripper units that are arranged opposite to each other for enabling the two first grippers of the two gripper units to move relative to each other.

7. A method for controlling a gripper apparatus, comprising the steps of:
   using a controller to control the gripper apparatus, whereas the gripper apparatus comprises at least one gripper unit, and each gripper unit is configured with a first connecting rod and a second connecting rod that are interconnected to each other; the first connecting rod has a first end and a second end that are arranged opposite to each other; and the second connecting rod has a third end and a fourth end that are arranged opposite to each other while enabling the third end to couple to the second end of the first connecting rod and the fourth end to couple to a driver, and in addition, there is an elastic part disposed at a joint of the first and the second connecting rods, while the elastic part is connected electrically to an encoder that is further to be electrically connected to the controller;
   enabling the controller to control the gripper apparatus to move toward an object in a first operation mode;
   enabling the gripper unit to engage the object and thus exert a force upon the object for enabling the elastic part to be deformed thereby while allowing the deformation of the elastic part to be measured and encoded by the encoder into a force information; and
   enabling the controller to switch the control of the gripper apparatus into a second operation mode according to the force information.

8. The method of claim 7, wherein the controller is programmed to execute a compliance control process, comprising the steps of:
   enabling the gripper apparatus to enter the first operation mode;
   generating a position command;
   determining whether the elastic part is deformed, if not, keep executing the position command, otherwise when the elastic part is deformed, switching into the second operation mode;
   changing a position integral value; and
   making an evaluation to determine whether the force reaches a predefined maximum, if not, maintaining the operation of the driver, otherwise when the force reaches the predefined maximum, stopping the operation of the driver.

9. The method of claim 8, further comprising the steps of:
   keeping executing the position command when the gripper unit is not engaged to the object while simultaneously making an evaluation to determined whether the position command is completed, and if so, stopping the operation of the position command, otherwise when the position command is not completed, keeping executing the position command.

10. The method of claim 8, further comprising the steps of:
    using a force meter to measure the force exerted upon the object by the gripper unit in a manner that the force meter is enabled to detect and measure a displacement of the first connecting rod or a feedback current value;
    keeping the drive to operate in a condition when the displacement of the first end of the first connecting rod is not smaller than a predefined displacement maximum or in a condition when the feedback current value is smaller than a predefined feedback current value maximum; and
    stopping the operation of the driver when the displacement of the first end of the first connecting rod reaches the predefined displacement maximum or in a condition when the feedback current value reaches the predefined feedback current value maximum.

* * * * *